United States Patent
Dibs et al.

(10) Patent No.: US 8,810,892 B2
(45) Date of Patent: Aug. 19, 2014

(54) MICRO-MIRROR SYSTEM AND ASSOCIATED CONTROL METHOD

(75) Inventors: Mohamad Iyad Al Dibs, Pfullingen (DE); Axel Wenzler, Rottweil (DE); Oliver Krayl, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 118 days.

(21) Appl. No.: 13/431,202

(22) Filed: Mar. 27, 2012

(65) Prior Publication Data

US 2012/0262775 A1 Oct. 18, 2012

(30) Foreign Application Priority Data

Mar. 29, 2011 (DE) .......................... 10 2011 006 337

(51) Int. Cl.
- *G02B 26/00* (2006.01)
- *G02B 26/02* (2006.01)
- *G02F 1/00* (2006.01)

(52) U.S. Cl.
USPC .......................... 359/290; 359/237; 359/223.1

(58) Field of Classification Search
USPC .............. 359/290–292, 298, 237, 242, 224.1, 359/223.1, 221.2
See application file for complete search history.

(56) References Cited

U.S. PATENT DOCUMENTS

| 7,031,045 B2* | 4/2006 | Neukermans et al. | 359/291 |
| 8,288,966 B2* | 10/2012 | Medin et al. | 315/360 |
| 2003/0123124 A1* | 7/2003 | Abu-Ageel | 359/290 |

\* cited by examiner

*Primary Examiner* — Joseph P Martinez
*Assistant Examiner* — Brandi Thomas
(74) *Attorney, Agent, or Firm* — Kenyon & Kenyon LLP

(57) ABSTRACT

A micro-mirror system having a micro-mirror actuator, a sensor for detecting the position of the micro-mirror actuator, a light module having at least one light source and an associated control system via which a light intensity of the light source is controllable, and an evaluation and control unit which is designed to control the micro-mirror actuator as a function of an output signal of the sensor. The system provides that the evaluation and control unit includes a compensation routine in which an offset voltage of the output signal of the sensor is settable as a function of the light intensity of the light source to be expected at the point in time that the micro-mirror actuator is activated.

6 Claims, 2 Drawing Sheets

MICRO-MIRROR SYSTEM AND ASSOCIATED CONTROL METHOD

RELATED APPLICATION INFORMATION

The present application claims priority to and the benefit of German patent application No. 10 2011 006 337.4, which was filed in Germany on Mar. 29, 2011, the disclosure of which is incorporated herein by reference.

FIELD OF THE INVENTION

The present invention relates to a micro-mirror system, an associated control method, a computer program with which the method may be carried out, and a memory medium which contains the computer program.

BACKGROUND INFORMATION

A micro-mirror actuator is a microelectromechanical component for dynamically modulating light. For micro-mirror actuators, a distinction is made between so-called microscanners and spatial light modulators.

In microscanners, a light beam is modulated on a continuously moved individual mirror. Light may be guided or "scanned" over a projection surface with grazing incidence. Microscanners are used in projection displays, bar code scanners, in endoscopy, and in spectroscopy, among other areas.

In spatial light modulators, the light is modulated via a mirror matrix. The individual mirrors undergo discrete deflections over time. The deflection of partial beams, i.e., a phase-shifting effect, is thus achieved. With the aid of a matrix configuration, micro-mirror actuators are able to deflect the light of a strong light source in such a way that an image is projected.

The micro-mirror actuators are generally composed of individual elements, configured in a matrix, in which the individual micro-mirror is composed of a tiltable reflective surface having an edge length of a few microns. The motion is brought about by the action of force of electrostatic fields. The angle of each micro-mirror may be individually adjusted, and the micro-mirror generally has two end states between which it is able to alternate up to 5000 times per second.

The mirror should be precisely deflected in order to direct the light beam exactly to a desired location. For example, a light beam composed of pixels should be directed in a targeted manner into one region in order to systematically and homogeneously establish an image.

To detect the deflection of the micro-mirror actuator, position sensors, in particular piezoresistive sensors, are mounted on the micro-mirror element or in close proximity thereto. Such sensors are able to detect vibrations and deflections. If a force is exerted on the mirror for the deflection, this results in a change in voltage at the output of the sensor.

The output voltage of such a sensor ideally has a curve as a function of the micro-mirror deflection which is ascertainable by measurement. The actual curve has several compensatable systematic errors, such as linearity errors and offset errors, as well as random errors due to instrument-related fluctuations.

It is known that a change in temperature for position sensors, in particular piezoresistive sensors, results in a zero shift of the sensor output voltage (change in the offset voltage). The static error characteristic curve and the temperature characteristic may be ascertained for the sensors and corrected via suitable compensation algorithms in the control and evaluation electronics system. The ambient temperature and the change in temperature of the sensor may be ascertained by a temperature sensor. The temperature-dependent zero shift of the sensor output voltage is thus continuously ascertainable, and may be taken into account in the compensation algorithm.

SUMMARY OF THE INVENTION

The exemplary embodiments and/or exemplary methods of the present invention are directed to a micro-mirror system having
  (i) a micro-mirror actuator;
  (ii) a sensor for detecting the position of the micro-mirror actuator;
  (iii) a light module having at least one light source and an associated control system via which a light intensity of the light source is controllable; and
  (iv) an evaluation and control unit which is designed to control the micro-mirror actuator as a function of an output signal of the sensor.

The system is characterized in that the evaluation and control unit includes a compensation routine in which an offset voltage of the output signal of the sensor is settable as a function of the light intensity of the light source to be expected at the point in time that the micro-mirror actuator is activated.

The exemplary embodiments and/or exemplary methods of the present invention are based on the understanding that for sensors for position detection, in particular piezoresistive sensors, a position of the offset voltage is also a function of the light intensity of the incident scattered light and of the angle of incidence of the scattered light. Piezoresistive semiconductor resistors in particular have a relatively high sensitivity to light. The offset voltage is thus also a function of light intensity I (t) striking the sensor.

Information concerning the light intensity which may possibly strike the sensor at a given point in time may be ascertained in advance, since all data necessary for this purpose are already present in the control system for the light module, or are specified by the configuration of the light source relative to the sensor and the design of the sensor. For micro-mirror actuators for imaging, intensity information, for example for the primary colors red, yellow, and blue (RGB), is established for each pixel. These data are usually available in high resolution in digital form, are read into the data field at a high frequency by the processor, and are temporarily present in a buffer memory before being relayed to the driver for the light source (a laser, for example). With the aid of the approach according to the present invention, the pixel information is now synchronized with the control of the micro-mirror module, thus allowing the light dependency of the offset of the sensor to be actively compensated for.

Accordingly, one aspect of the exemplary embodiments and/or exemplary methods of the present invention is the use of information, known per se, concerning the light intensity, which influences the position of the offset, of a beam to be directed from one or multiple light sources, for example an RGB laser, in order to continuously compensate for the offset or the change in offset of the sensor output voltage in the active state. This results in active compensation of the static light-dependent offset of the sensor by the actual position of the micro-mirror in the X, Y, and Z directions. In addition, active compensation of the dynamic light-dependent offset, whose frequency is in the bandwidth of the evaluation electronics system and which likewise distorts the actual position of the micro-mirror, may also be achieved. Overall, it is thus possible to carry out the position detection and the deflection in a very precise manner, resulting in increased image quality.

The intensity of the primary colors RGB of the light source may be taken into account for determining the offset voltage; scattered light effects of other wavelengths may generally be disregarded.

The sensor in particular is a piezoresistive sensor, for which the dependency of the offset voltage on the light intensity may be particularly high, depending on the design.

Another aspect of the exemplary embodiments and/or exemplary methods of the present invention relates to a method for controlling the previously described micro-mirror system. The method is characterized in that the evaluation and control unit includes a compensation routine in which an offset voltage of the output signal of the sensor is set as a function of the light intensity of the light source to be expected at the point in time that the micro-mirror actuator is activated.

Moreover, the exemplary embodiments and/or exemplary methods of the present invention relates to a computer program which, after being loaded into a memory medium of a data processing unit, allows the above-mentioned method for controlling a micro-mirror system to be carried out.

Lastly, the exemplary embodiments and/or exemplary methods of the present invention also relates to a computer-readable memory medium on which the computer program is stored.

The exemplary embodiments and/or exemplary methods of the present invention are explained in greater detail below with reference to one exemplary embodiment and the associated drawings.

DETAILED DESCRIPTION

Figure 1:
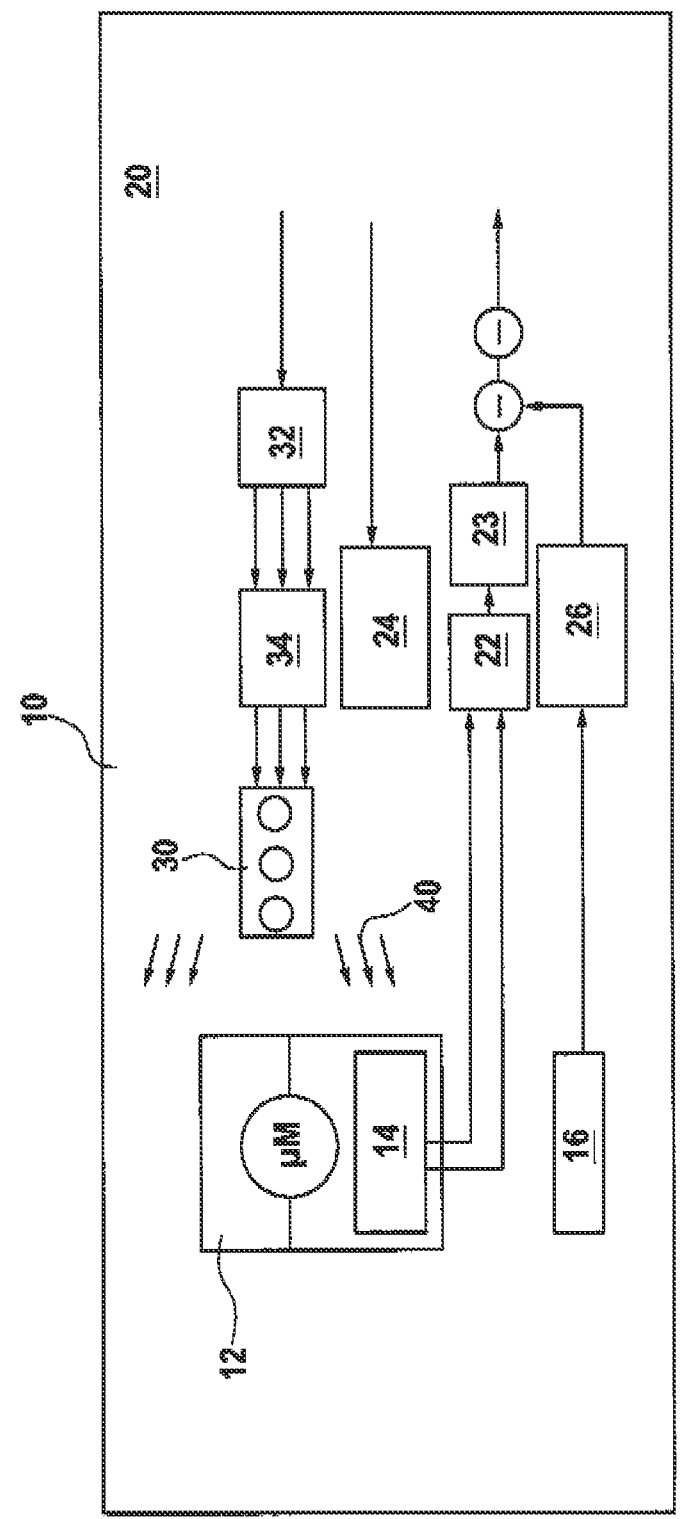
FIG. 1 shows a micro-mirror system having a conventional design.

FIG. 1 shows a micro-mirror system 10 having a micro-mirror module 12 which includes, among other elements, piezoresistive sensors 14 for detecting the relative position. A temperature sensor 16 continuously detects the instantaneous temperature of the position sensor.

System 10 also includes an evaluation and control unit 20 which is designed to control the micro-mirror actuator contained in micro-mirror module 12. Piezoresistive sensors 14 deliver an output signal, which via electronic filter elements 22, 23 is read into evaluation and control unit 20. A temperature-dependent offset characteristic curve 26 is taken into account for determining an instrument-related offset 24 for the output signal of piezoresistive sensors 14.

A light source 30, in the present case an RGB laser module, is operated via an independent control unit. A data field is transferred to a buffer memory 32, which in turn provides the data for laser driver 34.

Figure 2:
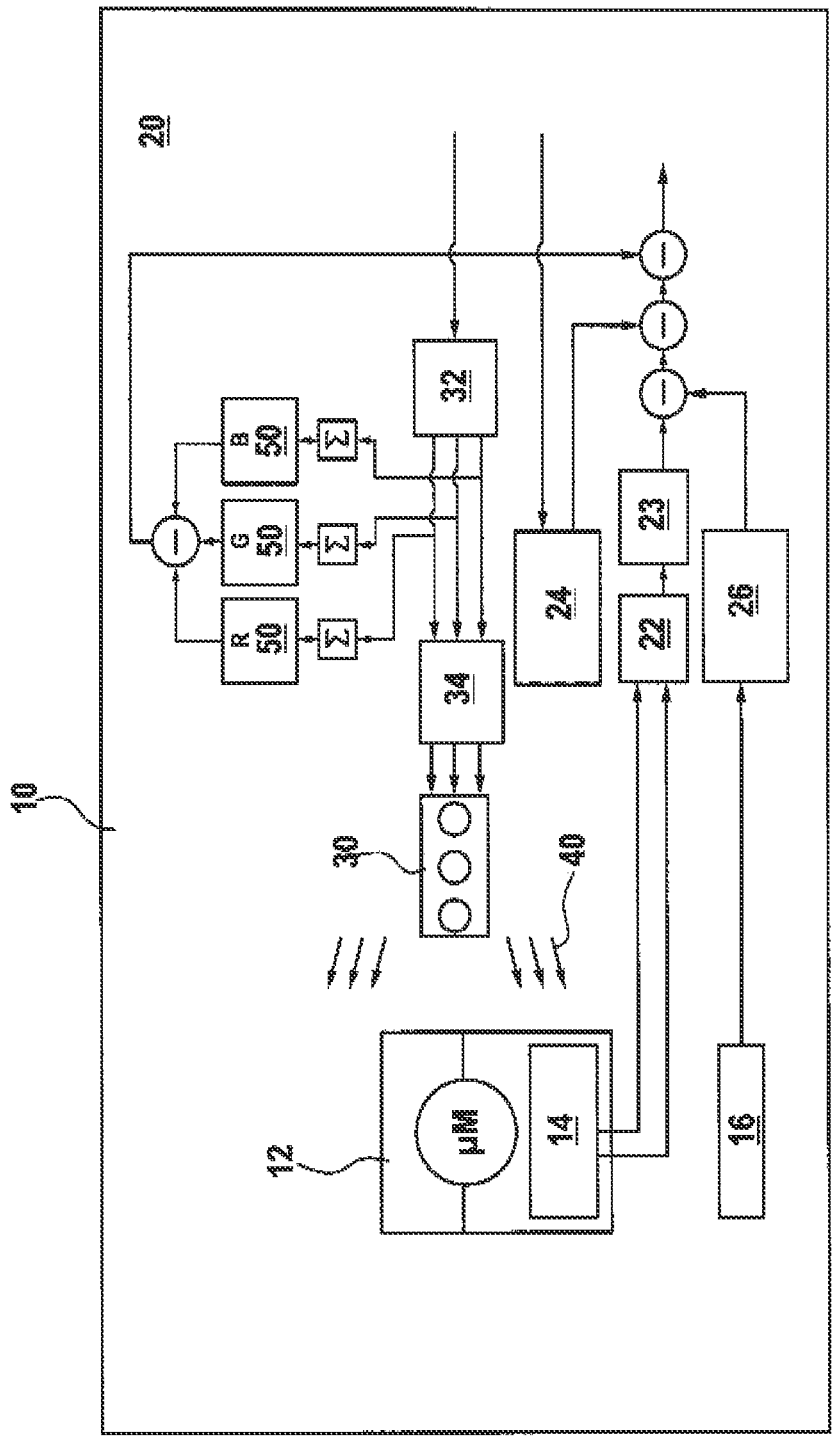
FIG. 2 shows a micro-mirror system according to the present invention.

Micro-mirror system 10 according to the present invention is illustrated in greater detail in FIG. 2. The same reference numerals have been used for components in the micro-mirror system according to the present invention which correspond to the known micro-mirror system according to FIG. 1.

Therefore, only the differences from conventional system 10 according to FIG. 1 are discussed in greater detail below. Also for micro-mirror system 10 according to the present invention, a temperature-dependent adaptation is carried out with the aid of offset characteristic curve 26. In addition, an active compensation is made for the effect of scattered light 40 on the offset output voltage of sensors 14. For this purpose, evaluation and control unit 20 has electronic elements 50 which evaluate the RGB data streams from buffer memory 32 with regard to the light intensity to be expected which will likely strike sensors 14 at the point in time that the micro-mirror actuator is activated. The offset of sensors 14 is corrected according to this predicted value.

The light beam directed onto the micro-mirror is also always scattered to a certain degree, and scattered light 40 influences the offset output voltage of piezoresistive sensor 14. The scattered light intensity to be expected may be determined, and the angle of incidence of the scattered light as well as the light sensitivity of the piezoresistive sensor 14 are specified. Thus, the offset shift caused by the light may be ascertained in advance for a point in time or a time interval before the image data are relayed to light source 30.

An adjustment of the offset due to a change in the light intensity may be made synchronously with the image data cycle, i.e., in the MHz range. However, such changes are generally no longer detectable by the band-limited evaluation electronics system. Therefore, frequently only the dynamic offset, which is in the bandwidth of the evaluation electronics system, is of interest. To be able to detect this dynamic offset within the bandwidth, the mean value of the offset-causing light intensity of each color may be ascertained via multiple data cells or multiple data fields, for example over a period of 2 ms to 16 ms for an image change of 60 Hz and a system bandwidth of 500 Hz.

A compensation algorithm is stored in the evaluation electronics system, for example in the form of a characteristic curve, as a function of the information concerning the light intensity and of the influencing factors. The light-dependent offset may then be actively compensated for in the active state of the sensor.

What is claimed is:

1. A micro-mirror system, comprising:
   a micro-mirror actuator;
   a sensor for detecting the position of the micro-mirror actuator;
   a light module having at least one light source and an associated control system via which a light intensity of the light source is controllable; and
   an evaluation and control unit to control the micro-mirror actuator as a function of an output signal of the sensor;
   wherein the evaluation and control unit includes a compensation routine in which an offset voltage of the output signal of the sensor is settable as a function of the light intensity of the light source to be expected at the point in time that the micro-mirror actuator is activated.

2. The micro-mirror system of claim 1, in which the intensity of the primary colors RGB of the light source is taken into account for determining the offset voltage.

3. The micro-mirror system of claim 1, in which the sensor is a piezoresistive sensor.

4. A method for controlling a micro-mirror system, the method comprising:
   controlling the micro-mirror actuator as a function of an output signal of the sensor with an evaluation and control unit of the micro-mirror system, which includes a micro-mirror actuator, a sensor for detecting the position of the micro-mirror actuator, and a light module having at least one light source and an associated control system via which a light intensity of the light source is controllable; and
   providing compensation, using the evaluation and control unit, by setting an offset voltage of the output signal of the sensor as a function of the light intensity of the light source to be expected at the point in time that the micro-mirror actuator is activated.

5. A computer readable medium having a computer program, which is executable by a data processing unit, comprising:
- a program code arrangement having program code for controlling a micro-mirror system, by performing the following:
  - controlling the micro-mirror actuator as a function of an output signal of the sensor with an evaluation and control unit of the micro-mirror system, which includes a micro-mirror actuator, a sensor for detecting the position of the micro-mirror actuator, and a light module having at least one light source and an associated control system via which a light intensity of the light source is controllable; and
  - providing compensation, using the evaluation and control unit, by setting an offset voltage of the output signal of the sensor as a function of the light intensity of the light source to be expected at the point in time that the micro-mirror actuator is activated.

6. The micro-mirror system of claim 2, in which the sensor is a piezoresistive sensor.

* * * * *